United States Patent
Ito et al.

(10) Patent No.: US 6,662,104 B2
(45) Date of Patent: Dec. 9, 2003

(54) NAVIGATION DEVICE

(75) Inventors: Yasunobu Ito, Anjo (JP); Kunihiro Yamada, Anjo (JP); Daisuke Kato, Anjo (JP)

(73) Assignee: Aisin AW Co., Ltd. (JP)

( * ) Notice: Subject to any disclaimer, the term of this patent is extended or adjusted under 35 U.S.C. 154(b) by 104 days.

(21) Appl. No.: 09/736,185

(22) Filed: Dec. 15, 2000

(65) Prior Publication Data

US 2001/0023388 A1 Sep. 20, 2001

(30) Foreign Application Priority Data

Feb. 22, 2000 (JP) ........................................ 2000-044382

(51) Int. Cl.$^7$ ................ G01M 17/00; G06F 19/00; G06F 7/00; B60L 1/00; B60L 3/00
(52) U.S. Cl. ..................... 701/207; 701/33; 701/36; 307/10.1
(58) Field of Search ................ 701/207, 33, 36; 340/825.06; 307/10.1

(56) References Cited

U.S. PATENT DOCUMENTS

| | | | | |
|---|---|---|---|---|
| 5,508,689 A | * | 4/1996 | Rado et al. | ................ 307/10.1 |
| 5,957,985 A | * | 9/1999 | Wong et al. | ................... 701/29 |
| 6,175,789 B1 | * | 1/2001 | Beckert et al. | ............ 248/27.1 |
| 6,202,008 B1 | * | 3/2001 | Beckert et al. | ............ 248/27.1 |
| 6,230,089 B1 | * | 5/2001 | Lonn et al. | ................... 701/33 |
| 6,370,449 B1 | * | 4/2002 | Razavi et al. | ................ 340/438 |
| 6,442,479 B1 | * | 8/2002 | Barton | ....................... 701/213 |

* cited by examiner

*Primary Examiner*—Yonel Beaulieu
*Assistant Examiner*—Brian J Broadhead
(74) *Attorney, Agent, or Firm*—Lorusso, Loud & Kelly

(57) ABSTRACT

The navigation device of the invention includes a main processing unit provided with a CPU and storage means; a sub-processing unit connected to the main processing unit; connectors for connecting the main processing unit and the sub-processing unit; and functional components connected to the sub-processing unit. In this case, even when the specifications of the various functional component (s) connected to the sub-processing unit are different, by designing and manufacturing the sub-processing unit in conformance with each component, the main processing unit can be designed and manufactured as a general-purpose (standardized) product. Therefore, not only is the mountability of the navigation device improved, but also the cost thereof is reduced.

9 Claims, 6 Drawing Sheets

NAVIGATION DEVICE

BACKGROUND OF THE INVENTION

1. Field of the Invention

The present invention relates to a navigation device.

2. Description of the Related Art

Conventionally, a vehicle navigation device, based on a detected current position of the vehicle and a destination set by the driver, and the like, searches for a route from the current position to the destination so that the vehicle can travel in accordance with the searched route. In addition, automatic transmission control systems have been developed to provide control based on navigation information and current position information received from the navigation device.

FIG. 2 is a block diagram of a conventional navigation device which includes a CPU 11 for overall control of the entire navigation device, a work memory (RAM) 12 used by the CPU 11 to temporarily store various data, such as route and guidance information, a ROM 13 in which various programs for searching a route to a destination and for providing guidance along the route, as well as a control program are stored, and a current position detection processing section 15. A GPS 16 and a gyro 17 are connected to the current position detection processing section 15. The GPS 16 receives radio wave transmissions from a satellite to detect the current position. The gyro 17 detects the yaw of the vehicle and integrates the detected yaw to determine the direction of the vehicle.

Further, the navigation device is provided with a driver 18 and a read/write device 19 for reading a data storage medium in which road condition data is recorded and for writing data onto the storage medium.

The navigation device also has a communication interface (I/F) 20 serving as a communication section, a communication device 21 connected to the communication interface 20, a semicustom IC 24, such as an application specific integrated circuit (ASIC) for example, for a specified drawing function, and a display device 25 connected to the ASIC 24. The navigation device is further provided with a voice LSI 26 to which a voice input/output device 27 is connected.

The display device 25 includes a screen for display of operation guidance, operation menus, operation keys, a guidance route 1 displayed with the current position, and map of areas around the current position. The display device 25 may be a CRT display, a liquid crystal display, a plasma display, or a hologram device which projects a hologram on a front glass.

The voice input/output device 27 includes a microphone, a voice synthesizer, and a speaker (not shown) for input of information by means of voice and output of guide information through the speaker as a voice synthesized by the voice synthesizer.

The navigation device also has a vehicle interface (I/F) 28 which allows the navigation device to operate in conformance with the vehicle in which the navigation device is installed. The navigation device receives, via the vehicle interface 28, vehicle information from the engine controller which controls the engine, the automatic transmission controller which controls the automatic transmission, and various sensors (an engine speed sensor, a throttle opening sensor, and a vehicle speed sensor, and the like).

A power source (not shown) generates a predetermined voltage for operating the various components including the CPU 11, the work memory 12, the ROM 13, the current position detection processing part 15, the GPS 16, the gyro 17, the driver 18, the player 19, the communication interface 20, the communication device 21, the ASIC 24, the display device 25, the voice LSI 26, the voice input/output device 27, and the vehicle interface 28. An input device (not shown) can be connected to the CPU 11 for correcting the current position when the vehicle starts running and for inputting a destination.

In the navigation device described above, the CPU 11 executes the guidance and display routines, whereby a current position and a map of the area around the current position are displayed on the display screen of the display device 25. When a driver of the vehicle operates the input device to set a destination, the CPU 11 executes a route search to provide a recommended route from the current position to the destination, and when such a route is determined, executes guidance with display of current position and a map of the area around the current position on the display screen whereby the vehicle's driver can follow the recommended route.

However, in the conventional navigation device, if the specifications of the various components such as the GPS 16, the gyro 17, the read/write device 19, the communication device 21, the display device 25, the voice input/output device 27, the engine control device, the automatic transmission control device, and the sensors are different, the internal communications (LAN) between the GPS 16, the gyro 17 and the current position detection processing section 15, between the read/write device 19 and the driver 18, between the display device 25 and the ASIC 24, between the voice input/output device 27 and the voice LSI 26, and between the engine control device, the automatic transmission control device, and the sensors and the vehicle interface 28 may differ, as will external communication between the communication interface 20, the communication device 21 and an external (remote) communication center (not shown). As a result, the specifications for the detection signals, control signals, various data, and power voltages become different. Further, if the specifications of other accessories such as audio equipment, video, and radio to be mounted on the navigation device are different, the specifications of the control signal to be transmitted between other components (not shown) may be different, or the specifications for the power voltages may be different.

Therefore, it is necessary that each navigation device be individually designed and manufactured for each model vehicle, which is provided with components having different specifications, or for each model vehicle which is equipped with other components with different specifications. These problems of compatibility/incompatibility between the various components lead to corresponding problems of mounting the navigation device in a given vehicle and cost.

SUMMARY OF THE INVENTION

Accordingly, one object of the invention is to provide a navigation device with improved mountability and reduced cost by solving the above-mentioned problems.

Therefore, the navigation device of the invention includes a main processing unit provided with a CPU and a memory, a sub-processing unit connected to the main processing unit, connection means for connecting the main processing unit and the sub-processing unit, and component(s) connected to the sub-processing unit.

In another embodiment of the present invention, the main processing unit is further provided with a drawing section having a drawing function. The components connected to the sub-processing unit include current position detection means for detecting a current position and a data recorder for recording data.

In still another embodiment of a navigation device of the invention, the main processing unit is further provided with a component identification means for identifying the components(s) connected to the sub-processing unit. The component identification means may identify the component by judging the type of the sub-processing unit.

In yet another embodiment of the navigation device of the invention, the sub-processing unit is further provided with a component identification information generation means for generating component identification information. The component identification means identifies the component based on the component identification information.

The aforementioned connection means may be a general-purpose interface.

In still another embodiment of the invention, the main processing unit is formed of three or more stacked circuit boards, and the sub-processing unit is formed of two or less circuit boards.

As described above, according to the present invention, the navigation device includes a main processing unit provided with a CPU and storage means, a sub-processing unit connected to the main processing unit, connection means for connecting the main processing unit and the sub-processing unit, and the component connected to the sub-processing unit. In this case, even if the specifications of the components connected to the sub-processing unit are different, the components of the sub-processing unit can be designed and manufactured for compatibility with the various components, whereby the main processing unit can be designed and manufactured as a general-purpose product. Therefore, not only the mountability of the navigation device can be improved, but also the cost thereof can be reduced.

In another embodiment of the invention, the main processing unit is provided with a component identification processing means for identifying the component(s) connected to the sub-processing unit, for determining the specifications of the component(s), and for, based on the results of that determination, generating control signals and data for transmission to the sub-processing unit.

In still embodiment, the component identification processing means identifies the component by further judging the type of the sub-processing unit. By judging the type of the sub-processing unit, the component identification processing means can identify the component connected to the sub-processing unit and can determine the specifications of the component. Accordingly, based on the result of determination, control signals for the sub-processing unit and various data are generated and transmitted to the sub-processing unit.

In still another embodiment of the invention, the sub-processing unit is further provided with a component identification information generation means for generating identification information. The component identification processing means identifies the component based on the component identification information and determines the specifications of the component.

In another preferred embodiment of the invention, the main processing unit is formed of three or more stacked circuit boards, and the sub-processing unit is formed of two or less circuit boards. By stacking the circuit boards of the main processing unit, the generation of noise in the bus can be suppressed. In addition, since the sub-processing unit is formed of two or less circuit boards, the cost of the navigation device can be reduced.

BRIEF DESCRIPTION OF THE DRAWINGS

The foregoing and other features and advantages of the present invention will become understood by reference to the following detailed description when read in conjunction with the accompanying drawings wherein.

DETAILED DESCRIPTION OF THE PREFERRED EMBODIMENTS

Hereinafter, preferred embodiments of the invention will be described in detail with reference to the drawings.

Figure 1:
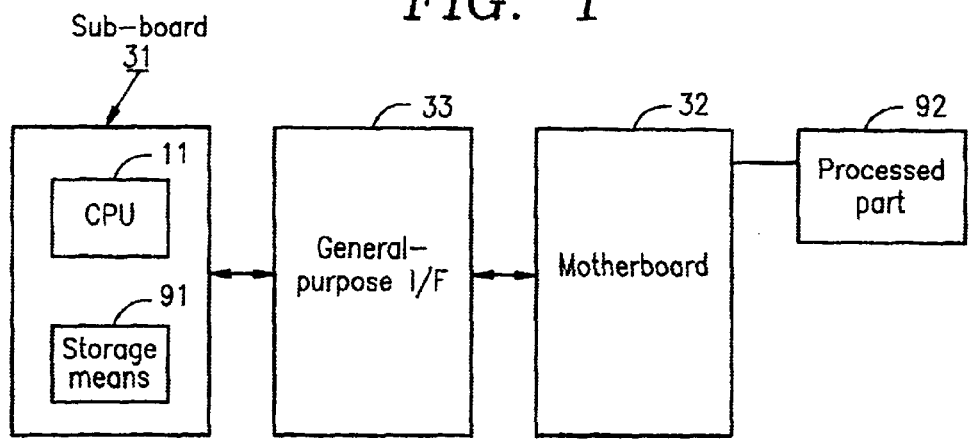
FIG. 1 is a block diagram of the navigation device of a first embodiment of the invention.
Figure 2:
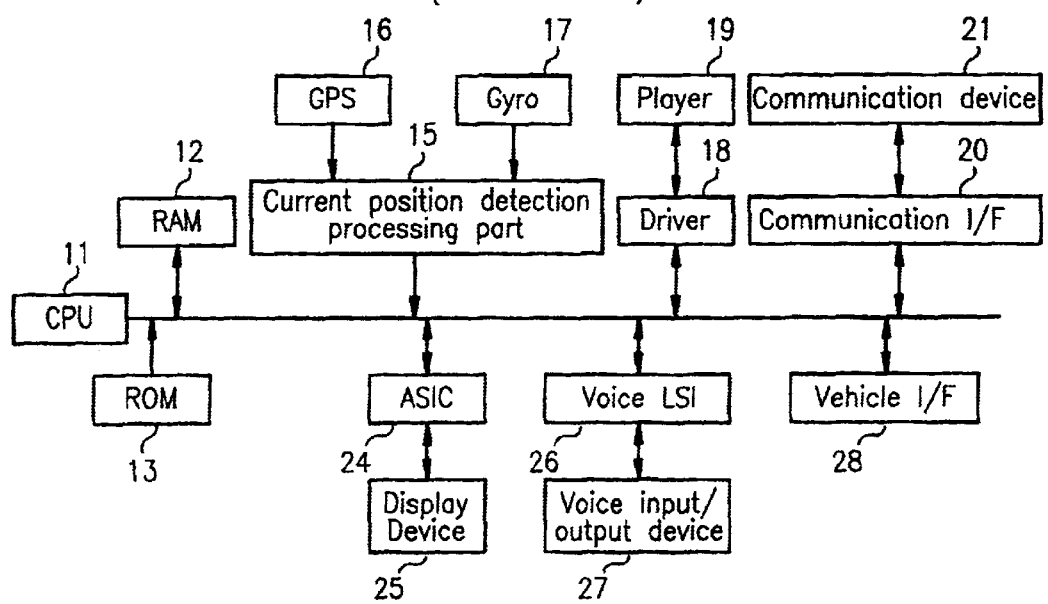
FIG. 2 is a block diagram of a related-art navigation device.
Figure 3:
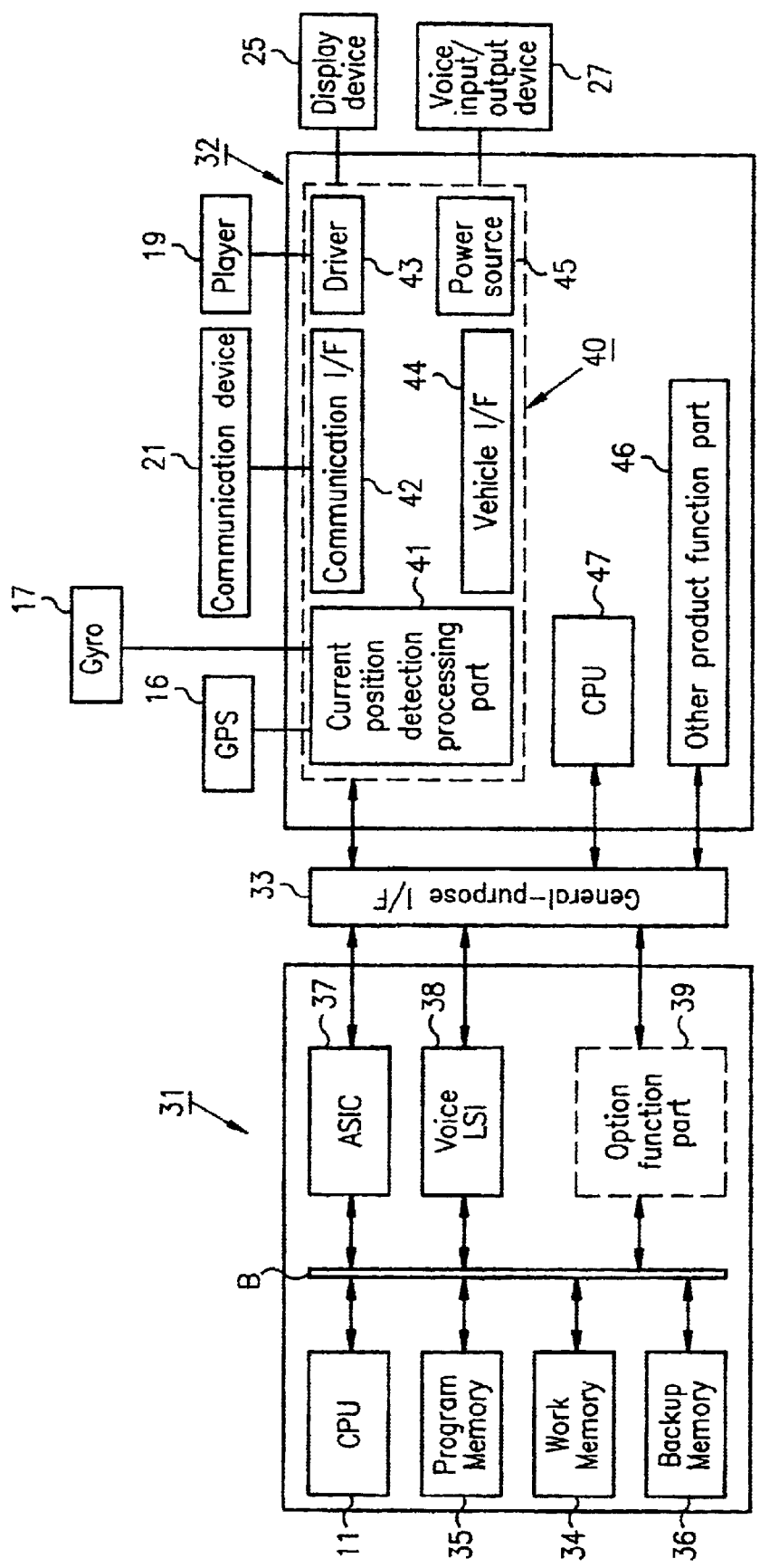
FIG. 3 is a more detailed block diagram of the navigation device of the first embodiment of the invention.
Figure 5:
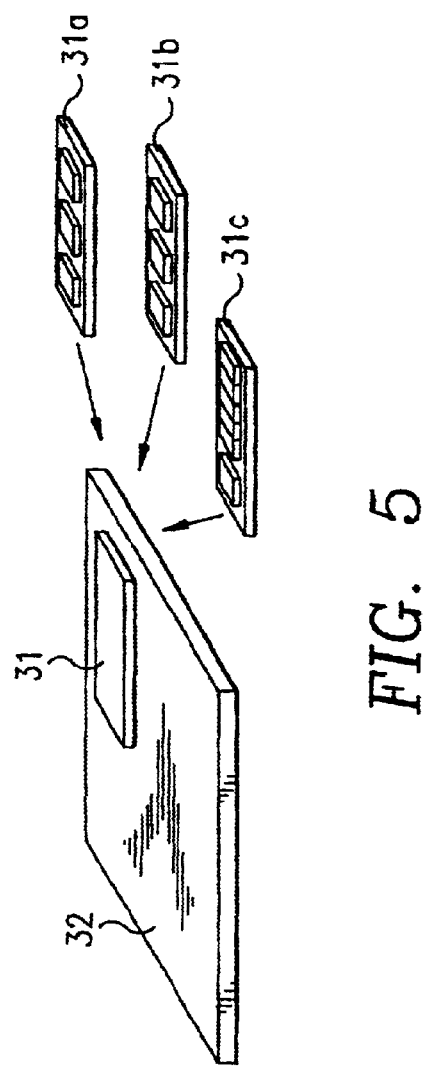
FIG. 5 is a perspective view illustrating loading of the sub-board of the first embodiment of the invention.

As shown in FIG. 1, a sub-board 31 serves as a main processing unit provided with a CPU 11 and memory 91, a motherboard 32 serves as a sub-processing unit connected to the sub-board, and general-purpose interface 33 connects the sub-board 31 and the motherboard 32. A component 92 is shown connected to the motherboard 32.

Referring now to FIGS. 3–6, a sub-board 31 serves as the main processing unit, a motherboard 32 serves as the sub-processing unit formed independently from the sub-board 31, and a general-purpose interface 33 serves to connect the sub-board 31 and the motherboard 32. In the present embodiment, the sub-board 31 and motherboard 32 are circuit boards, the sub-board 31 is mounted on the motherboard 32, and a board-to-board connector is used as the general-purpose interface 33. The sub-board 31 can be made of a custom chip or a card. If the sub-board 31 is a card, the sub-board 31 can be freely inserted into and ejected from a card slot formed in the navigation device.

In the present embodiment, although a board-to-board connector is used as the general-purpose interface 33, in place of the board-to-board connector, a flexible cable, solder pins, or the like can be used instead. In the present embodiment, although the sub-board 31 is mounted on the motherboard 32, the sub-board 31 and the motherboard 32 may be separated from each other and connected or the sub-board 31 and the motherboard 32 may both be mounted on another board.

The sub-board 31 is provided with the CPU 11 for overall control of the entire navigation device, a working memory 34 for use by the CPU 11 executing various routines, a program memory 35 storing various programs including route search, route guidance and control programs, a backup memory 36, a semicustom IC for performing drawing functions, an ASIC 37, a voice LSI 38, and an optional component controller 39 for controlling optional devices such as a FM multiplex decoder and VICS. Components such as the CPU 11, the working memory 34, the program memory 35, the backup memory 36, the ASIC 37, the voice LSI 38, and the optional component controller 39 on the sub-board 31 are connected to each other via a bus B. The ASIC 37, the voice LSI 38, and the optional component controller 39 are connected to the general-purpose interface 33. The working memory 34, the program memory 35, and the backup memory 36 constitute the storage means 91 (FIG. 1) and a recording medium.

The motherboard 32 includes a navigation control section 40, a CPU 47, and an accessory interface 46. The navigation control section 40 includes a current position detection processing unit 41, a communication interface 42, a driver 43, a vehicle interface 44, and a power source 45. The navigation control section 40, the accessory interface 46, and the CPU 47 are connected through the general-purpose interface 33.

A GPS 16 and a gyro 17 are connected for input to the current position detection processing unit 41. The GPS 16 receives radiowave transmissions generated from satellites to detect a current position on the earth, and the gyro 17 detects the yaw rate of the vehicle and integrates the detected yaw rate to determine the direction of the vehicle. The gyro 17 may be a gas gyro, a vibrating gyro, or the like. The current position detection means includes the GPS 16 and the gyro 17. Furthermore, the read/write device 19 provides for data storage and data recording part and is driven by the driver 43 to read the road condition data from a recording medium placed in the read/write device 19, for example, a DVD and to write data onto the recording medium.

Communication device 21 is connected to the communication interface 42 for communication between the communication device 21 and a remote communication station (not shown) having, for example, an FM transmitter and a telephone circuit to transmit and receive various data. Various items of data received from such a remote communication station would include, for example, road information regarding traffic congestion, information on traffic accidents, and D-GPS information for detecting errors in the GPS derived position information.

The vehicle interface 44 is matched with the vehicle in which the navigation device is mounted, and provides for communication with an engine control unit which controls the vehicle engine (not shown), an automatic transmission control unit which controls the vehicle's automatic transmission (not shown), and also receives signals from various sensors including an engine speed sensor, a throttle opening sensor, a vehicle speed sensor, and like sensors.

The power source 45 generates a predetermined voltage and applies the voltage to the components of the sub-board 31 including the CPU 11, the working memory 34, the program memory 35, the backup memory 36, the ASIC 37, the voice LSI 38, and the optional component 39, and also, applies the voltage to the components of the motherboard 32 including the current position detection processing section 41, the communication interface 42, the driver 43, the vehicle interface 44, the accessory interface 46, and the CPU 47. The power source 45 also applies the voltage to the various other components including the GPS 16, the gyro 17, the read/write device 19, the communication device 21, the display 25, and the voice input/output device 27.

Furthermore, an input device (not shown) for correction of the current position when the vehicle starts running and input of a destination may be connected to the navigation control section 40. The input device may be a keyboard separate from the display device 25, a mouse, a barcode reader, a light pen, or a remote controller. Moreover, the input device can be a touch panel by which input can be made by touching keys or a menu displayed as an image on the display device 25.

In a navigation device integrally loaded with accessories such as an audio device, a video, and/or a radio, these accessories are connected through the accessory interface 46.

Furthermore, the display device 25 and the voice input/output device 27 are connected to the navigation control part 40 via a display processing unit and a voice input/output processing unit (not shown), respectively. On the screen of the display device 25, operation guidance, operation menus, operation keys, and guidance along a route to be taken are displayed, as well as the current position, a map around the current position, and a route to the destination. The display device 25 may be a CRT display, a liquid crystal display, a plasma display, or a hologram device which projects a hologram on the front glass. The voice input/output device 27 includes a microphone, a voice synthesizer, a speaker, not shown, and provides for input by means of voice and output of guidance information from the speaker by means of voice synthesized by the voice synthesizer. Instead of the voice synthesized by the voice synthesizer, various items of guidance information may be recorded on a tape and output from the speaker.

In the above-described navigation device, the CPU 11 executes guidance and display processing to display the current position and a map of an area around the current position on the display screen of the display device 25. When a driver of the vehicle sets a destination through the input device, the CPU 11 executes a route search routine to determine a route from the current position to the destination, and when a route is determined, executes guidance and display routines to display the current position and a map of an area surrounding the current position on the display screen for guidance along the route. At this time, a drawing routine is executed by the ASIC 37. Accordingly, the driver is able to drive the vehicle along the determined/recommended route.

Furthermore, navigation information including the current position or the like is transmitted to the automatic transmission control unit via the vehicle interface 44 from the navigation device so as to control the vehicle. In this case, for example, when the vehicle approaches a corner, corner control of the vehicle is implemented, whereby the vehicle is able to turn the corner with the transmission in low-speed, and when the vehicle approaches an intersection, intersection control of the vehicle is implemented, whereby the vehicle is able to pass through the intersection with the transmission in low-speed.

In the present embodiment, the current position detection processing unit 41 is connected to the GPS 16 and the gyro 17; however, instead of the GPS 16 and the gyro 17, the unit 41 may be connected to another current position detection means such as a terrestrial magnetism sensor, a distance sensor, a steering sensor, a beacon sensor, or an altimeter.

The terrestrial magnetism sensor detects the direction of the vehicle by measuring the terrestrial magnetism, and the distance sensor detects distance between predetermined points on a road. The distance sensor may be, for example, a sensor which measures the number of wheel revolutions (not shown) and determines a distance based on the number of revolutions, or a sensor which measures acceleration and integrates the acceleration twice to determine distance. The steering sensor detects the steering angle and may be, for example, an optical rotation sensor mounted on a steering wheel (not shown), a rotation resistance sensor, or an angle sensor mounted on the wheel. The beacon sensor receives positional information from beacons disposed along the road to detect the current position.

The GPS 16 and the beacon sensor can independently detect the current position, however, in the case of the distance sensor, the current position is detected by combining the distance detected by the distance sensor and the direction detected by the terrestrial magnetism sensor. Alternatively, the current position can be detected by combining the distance detected by the distance sensor and the steering angle detected by the steering sensor.

The read/write device 19 receives a storage medium containing a map data file, an intersection data file, a node data file, a road data file, a photo data file, and a data file with information for each main area concerning hotels, gas stations, and guidance to tourist resorts. In the data files, in addition to the data for searching a route, various data is stored for display of a guide map along the recommended route, characteristic photos and frame views of intersections and the route, the distance to the next intersection, the direction to be travelled by the vehicle from the next intersection, and other guidance information on the screen of the display device 25. In the medium received by the player 19, various data for outputting predetermined information from the voice input/output device 27 is also stored.

Intersection data concerning the respective intersections is stored in an intersection data file, node data concerning the nodes is stored in a node data file, and road data concerning the roads is stored in a road data file. Road condition data includes the intersection data, the node data, and the road data. The node data indicates the position and shape of a road in the map data stored in the map data file, and is composed of various items of data including coordinates indicating the absolute position of each node on a road, length of links connecting the nodes, and link angle showing the absolute direction at each node. With the road data, the width, slope, cant, bank, condition of the surface, number of lanes, point at which lanes merge and/or decrease in number, and the point at which the width decreases are all indicated for a given road. The radius of curvature, intersections, T-junctions, and entrances to corners are indicated for corners. Railroad crossings, highway exit ramps, tollgates of highways, downhill lanes, uphill lanes, road classification (national roads, general roads, highways, and the like) are indicated as road attributes. In the present embodiment, a DVD is used in the player 19, and semiconductor memories are used as the working memory 34, the program memory 35, and the backup memory 36. However, in place of the DVD and semiconductor memories, a magnetic core, a magnetic tape, a magnetic disk, a floppy disk, a magnetic drum, a CD, an MD, an optical disk, an IC card, an optical card, and the like may be used.

In the present embodiment, various programs are recorded in the program memory 35, and various data is recorded in the external medium received in the player 19, however, the various programs and the data may be stored in the same external recording medium. In this case, for example, a flash memory may be provided on the sub-board 31, whereby the programs and data are read-out from the external recording medium and written onto the flash memory. Consequently, by replacing the external recording medium, the programs and data can be updated. Thus, by starting various programs recorded in the recording medium, various routines can be executed based on a predetermined data. In addition, at least a part of the programs and data can be received by the communication device 21 and recorded in the flash memory.

If the specifications of the component 92 including the GPS 16, the gyro 17, the read/write device 19, the communication device 21, the display device 25, the voice input/output device 27, the engine control device, the automatic transmission control device, and the sensors are different, then the internal communication (LAN) methods between the GPS 16, the gyro 17 and the current position detection processing part 41, between the player 19 and the driver 43, between the display device 25, the voice input/output device 27 and the navigation control part 40, and between the engine control device, the automatic transmission control device, the sensors and the vehicle interface 44 may be different, or the external communication methods between the communication interface 42, communication device 21 and the external, remote communication station may be different. As a result, the specifications of the detection signals, control signals, various data, and power voltage become different. When the specifications of other accessories such as the audio equipment, the video equipment, and the radio which are connected to and/or mounted in the navigation device are different, the specifications of the control signals to be transmitted between the accessory interface 46 and accessories may be different, or the specifications for the required power voltage may be different.

In this case, the navigation device must be designed and manufactured for each model provided with a component 92 having different specifications, or for each model provided with accessories with different specifications. This not only poses a problem in the mounting of the navigation device in a given vehicle, but also increases the cost.

Therefore, in the present embodiment, the sub-board 31 and the motherboard 32 are independently designed and manufactured. Accordingly, the components of the motherboard 32 are designed and manufactured in accordance with the specifications of component 92, whereby the sub-board 31 can be designed and manufactured as a general-purpose product. This not only improves the adaptability of the navigation device for mounting, but also reduces the cost.

In a case where the sub-board 31 and motherboard 32 are connected, since the motherboard 32 has been designed and manufactured in accordance with the component 92, the control signals and various data to be transmitted to the motherboard 32 from the sub-board 31 must be generated in accordance with the type of the motherboard 32 or the specifications of the component 92.

Therefore, when component identification information generation means (not shown) is provided in the CPU 47, and component identification processing means (not shown) is provided in the CPU 11, and the component identification processing means sends a component information transmission request to the CPU 47, the component identification information generation means generates component identification information indicating the type of the motherboard 32 in accordance with the component information transmission request, and transmits the component identification information to the CPU 11 as status information.

The component identification means judges the type of the motherboard 32 based on the status information, identifies each component 92 based on the results of the determination and determines the specifications of each component 92. The component identification processing means successively makes the following determinations 1, 2, . . . , the internal communication method between the GPS 16, the gyro 17 and the current position detection unit 41, between the player 19 and the driver 43, between the display device 25, the voice input/output device 27 and the navigation control unit 40, and between the engine control device, the automatic transmission control device, the sensors and the vehicle interface 44, and the external communication method between the communication interface 42, the communication device 21 and the external, remote communication station. Then, the component identification means generates control signals and various items of data based on the results of the determinations, and transmits them to the motherboard 32.

The sub-board 31 may be a standard board 31a which executes processing at a medium processing rate with a medium-level function, a high-performance board 31b which executes processing at a high processing rate, or a high-function board 31c which executes processing with a high function.

The sub-board 31 may be detachably inserted or mounted in the navigation device. In this case, at the time of maintenance service the sub-board 31 may be optionally replaced to change the performance and function, thus allowing standardization of the sub-board 31.

Figure 6:
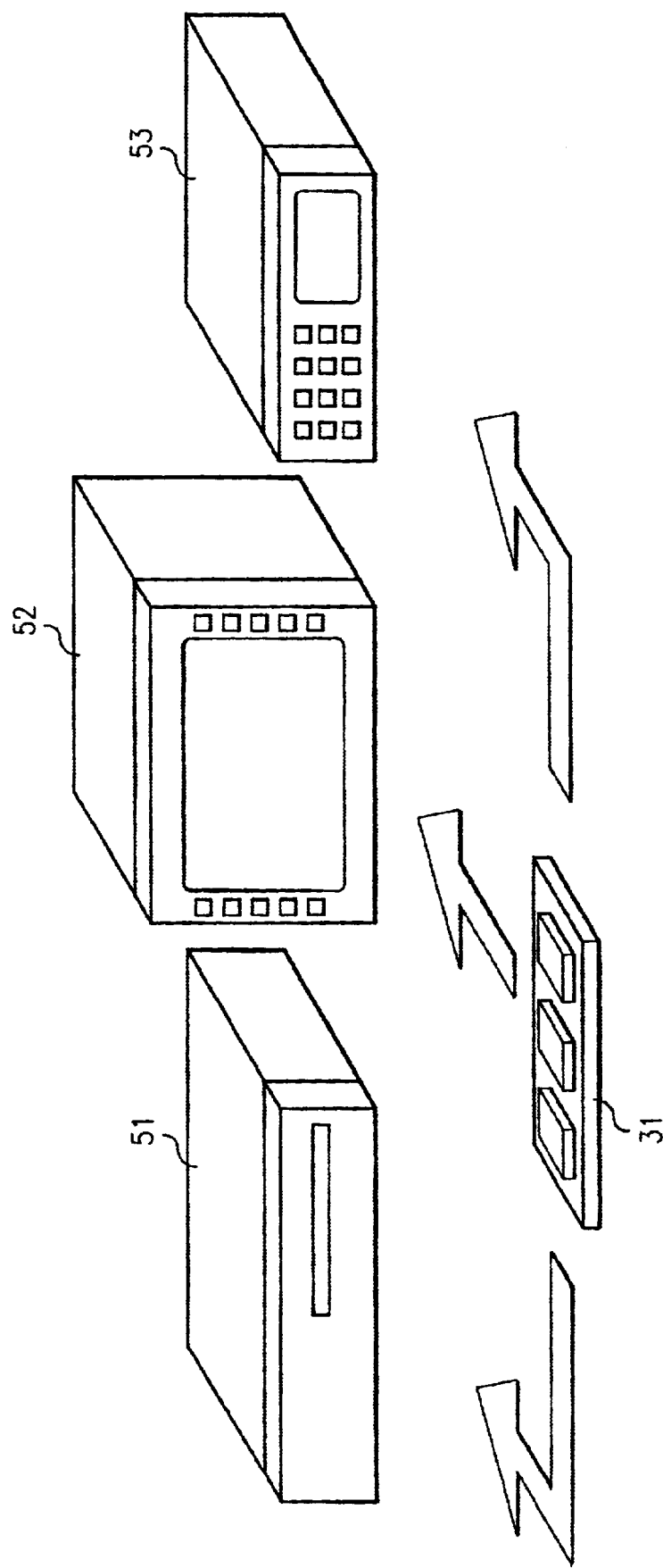
FIG. 6 is a perspective view showing the example of loading the sub-board to the navigation device of the first embodiment of the invention.

As shown in FIG. 6, the navigation device in which the sub-board 31 is to be mounted may be the type in which the motherboard 32 and the display device 25 are housed in separate casings, mounted in a navigation device 52, the type in which audio and video equipment are integrally housed in one casing, or of the type in which the motherboard 32 and a radio are integrally housed in one casing. However, because the motherboard 32 is designed in conformance with the particular type of navigation device, the sub-board 31 can be designed and manufactured as a general-purpose (standardized) product.

Figure 4:
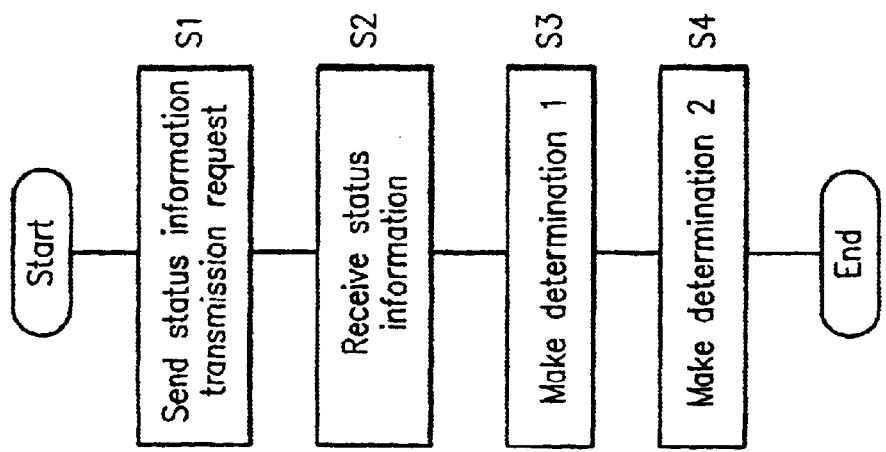
FIG. 4 is a flow chart of a routine for operation of the sub-board of the first embodiment of the invention.

In the routine illustrated by the flow chart of FIG. 4, status information transmission is requested at S1, the status information is received at S2, determination #1 is made at S3 and determination #2 is made at S4 and the processing is terminated.

Figure 7:
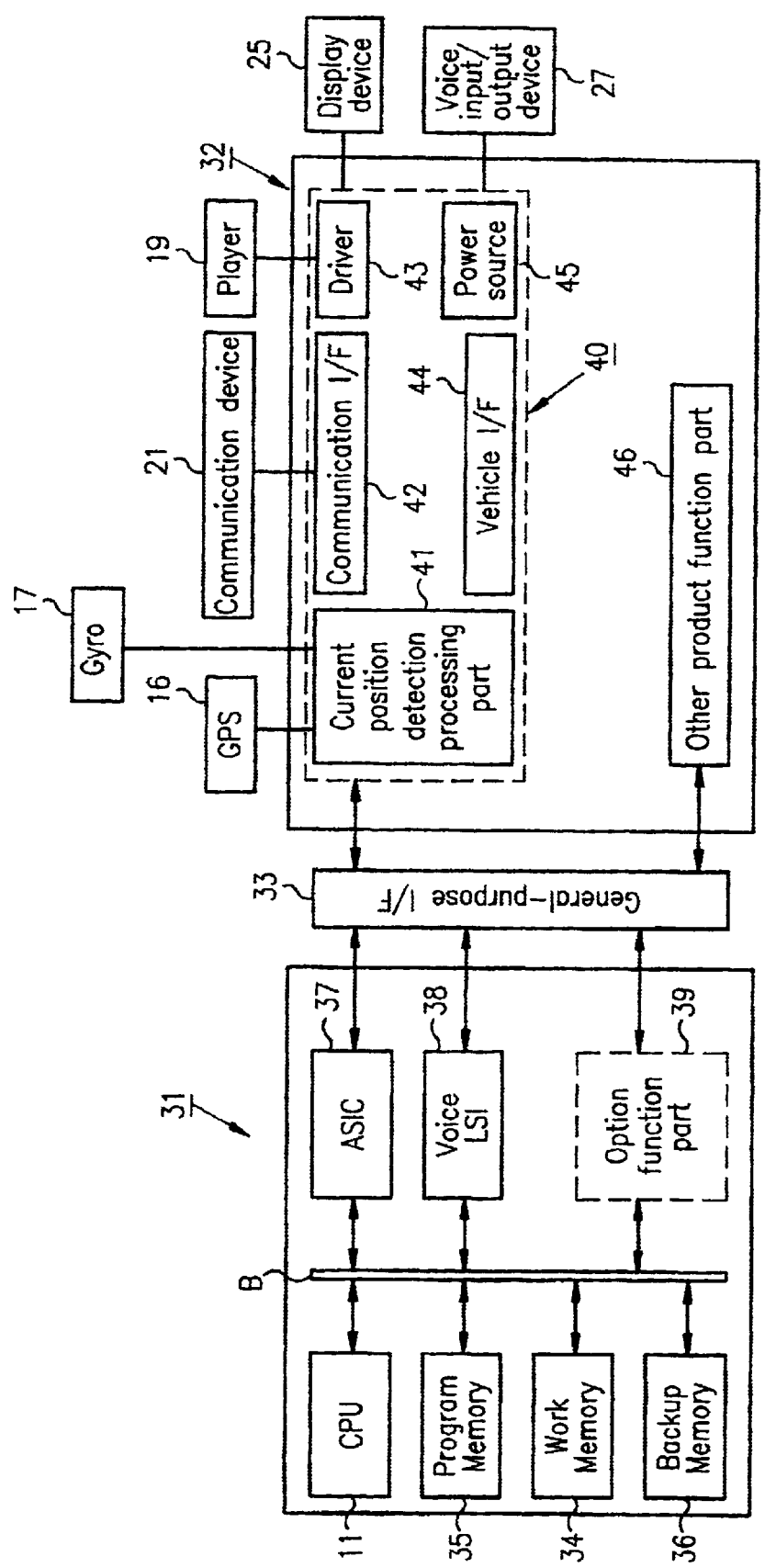
FIG. 7 is a block diagram of the navigation device of a second embodiment of the invention.

Next, a second embodiment of the invention will be described with reference to FIG. 7. Components that have the same structures as those of the first embodiment are referenced by the same reference numerals, and description thereof is omitted.

In the second embodiment, a component identification information generation means, not shown, is provided with the processed part 92 (FIG. 1). When the component identification processing means of the CPU 11 sends a component information transmission request to the component 92, the component identification information generation means generates component identification information indicating the specifications of the component 92 in accordance with the component information transmission request. Then the component identification information generation means transmits the component identification information to the CPU 11 as status information.

Upon receiving the status information, the component identification processing means identifies the component 92 based on the status information, and determines the specifications of the component 92. For example, the component identification processing means determines the internal communication method between the GPS 16, the gyro 17, and the current position detection processor 41, between the read/write device 19 serving as a data recorder and the driver 43, between the display device 25, the voice input/output device 27, and the navigation control section 40, and between the engine control device, the automatic transmission control device, the sensors, not shown, and the vehicle interface 44, and also determines the external communication method between the communication interface 42, the communication device 21, and the unillustrated remote communication station, and based on these determinations, generates a control signal and various items of data for transmission to the motherboard 32 serving as a sub-processing unit.

For example, in a case where the read/write device 19 is the component 92 and identification information generation means is provided in the device 19, when the component identification processing means sends a component information transmission request to the read/write device 19, the component identification information generation means of the device 19 reads-out component identification information identifying the specifications of the device 19 from a recording medium, for example, a DVD set in the read/write device 19 in accordance with the component information transmission request, and transmits the information to the CPU 11 as status information.

Upon receiving the status information, the component identification means identifies the read/write device 19 based on the status information and determines the specifications of the device 19. The component identification processing means determines the internal communication method between the read/write device 19 and the driver 43 and, based on that determination, generates a control signal for the read/write device 19 and various items of data, and sends them to the motherboard 32.

At the same time as reading-out the component identification information from a DVD, the player 19 may also read-out a program from the DVD.

In the above-described preferred embodiments, the component identification information generation means is provided in the CPU 47 or the component 92, and component identification information generated by the component identification information generation means is transmitted to the CPU 11 as status information. However, the component identification processing means can identify the read/write device 19 and determine the specifications of the device 19 based on the electric conditions of a plurality of communication ports (communication lines) disposed on the sub-board 31 (serving as a main processing unit) and the motherboard 32. In this case, the component identification information generation means is comprised of the communication ports.

Therefore, in accordance with the type of the motherboard 32 or the specifications of the component 92, levels (1 or 0) of identification signals are output to the communication ports on the motherboard 32 side. On the sub-board 31 side, an identification signal table is recorded in the backup memory 36 or the like, and the component identification processing means reads the levels of the identification signal input to the communication ports on the sub-board 31 side and, by referring to the identification signal table based on the combination of the levels, identifies the component 92 and determines the specifications of the component 92.

In place of the communication ports, voltage ports may be used. In this case, on the motherboard 32 side, predetermined voltage signals are generated in accordance with the type of the motherboard 32 or the specifications of the component 92, and output to the voltage ports on the motherboard 32 side. On the sub-board 31 side, a voltage signal table is recorded in the backup memory 36, and the component identification processing means reads the levels of the voltage signals input to the voltage ports on the sub-board 31 side, and identifies the component 92 by applying the read levels to the voltage signal table and determines the specifications of the component 92.

Figure 8:
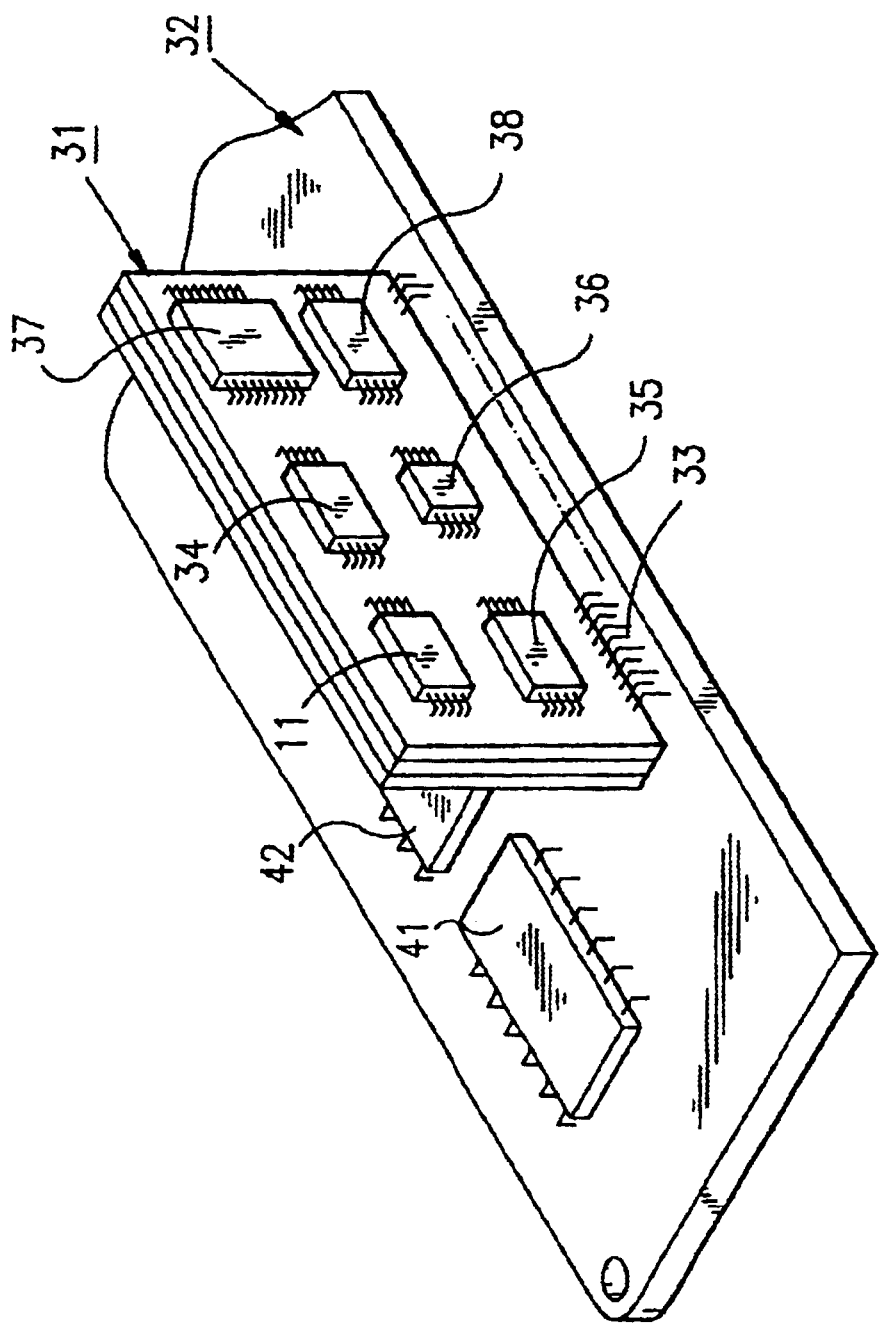
FIG. 8 is a perspective view showing an assembly of a sub-board and a motherboard of a third embodiment of the invention.

In the above-described embodiments, the CPU 11 transmits, in synchronization with a clock signal, control signals or data to the working memory 34, the program memory 35, the backup memory 36, the ASIC 37, the voice LSI 38, and the optional component 39 via the bus B, so that if noise occurs in the bus B, the noise influences the connected components. Therefore, a third embodiment of the invention, illustrated in FIG. 8, has as its objective control of the generated noise. Components that have the same structures as those of the first embodiment are referenced by the same reference numerals, and description thereof is omitted.

In the third embodiment, the sub-board 31 (the main processing unit) is provided with the CPU 11, and the CPU 11 transmits, in synchronization with a clock signal, control signals or data to the working memory 34, the program memory 35, the backup memory 36, the ASIC 37 (drawing processor), the voice LSI 38 and the optional component 39 (FIG. 3) via the bus B. The ASIC 37 and voice LSI 38 have the function of an I/O port, and the output control signals or data are output to the motherboard 32 as a sub-processing unit and control signals or data are input from the motherboard 32 via the ASIC 37 and the voice LSI 38.

Since the ASIC 37 and the voice LSI 38 have the function of an I/O port, noise is most easily generated in the bus B which connects the CPU 11, the ASIC 37, and the voice LSI 38. Therefore, the sub-board 31 is formed as a multi-layer (stacked) structure of three or more circuit boards (four in the present embodiment). Accordingly, generation of noise in the bus B is suppressed, whereby the influences of noise on other components can be prevented.

In buses and signal lines (not shown) within the motherboard 32 of the third embodiment, the generation of noise is less because the motherboard 32 is formed of two layered (stacked) circuit boards. Accordingly, the cost of the motherboard 32 can be reduced, and the total cost of the navigation device can also be reduced.

The invention is not limited to the above-mentioned embodiments, but can be variously modified within the spirit of the invention, and such modifications are intended to be included within the scope of the invention.

The teachings of Japanese Application No. 2000-44382, filed Feb. 22, 2000 are incorporated herein in their entirety, inclusive of the specification, claims and drawings.

What is claimed is:

1. A navigation device comprising:
   at least one component providing a signal representing a parameter utilized in providing navigational guidance;
   a motherboard for receiving the signal, said motherboard being designed in accordance with specifications of said component, said motherboard comprising:
      a vehicle interface matched with a vehicle in which said navigation device is mounted, said vehicle interface providing communication with an engine control unit which controls an engine in the vehicle, said vehicle interface receiving signals from sensors including a vehicle speed sensor;
      a current position detection processing unit, said current position detection processing unit receiving signals from current position detection means;
   a standardized sub-board comprising:
      component identification means for judging the type of said motherboard, and for generating control signals for the motherboard in accordance with the judged type of motherboard; and
      a CPU for overall control of the entire navigation device and for execution of a vehicle navigation program;
      a working memory, a program memory containing the vehicle navigation program, an ASIC, and a voice LSI; and
   connection means for connecting said motherboard and sub-board.

2. A navigation device as set forth in claim 1 wherein said sub-board determines specifications of said component based on the judged type of motherboard and generates the control signals in accordance with the determined specifications.

3. A navigation device as set forth in claim 1 wherein each of said motherboard and said sub-board comprises at least one circuit board.

4. A navigation device as set forth in claim 1 wherein said sub-board is detachably connected to said motherboard.

5. A navigation device as claimed in claim 1 wherein the navigation program stored in said program memory includes route search and route guidance programs.

6. A navigation device as claimed in claim 1 wherein said connection means is a board-to-board connector, a flexible cable or solder pins.

7. A navigation device as claimed in claim 1 wherein both said motherboard and said sub-board are circuit boards, wherein said sub-board is mounted on said motherboard and wherein said connection means is a board-to-board connection.

8. A navigation device as claimed in claim 1 wherein said motherboard and said sub-board are both mounted within the navigation device.

9. A navigation device as claimed in claim 1 wherein said connection means includes a card slot in said motherboard and wherein said sub-board can be freely inserted into and ejected from said card slot.

* * * * *